United States Patent
Spelter et al.

(10) Patent No.: US 11,273,398 B2
(45) Date of Patent: Mar. 15, 2022

(54) FUEL FILTER WITH ORGANOCLAY, CLEANING CARTRIDGE WITH ORGANOCLAY, AND USE

(71) Applicant: MANN+HUMMEL GmbH, Ludwigsburg (DE)

(72) Inventors: Lars Spelter, Ditzingen (DE); Jens Neumann, Stuttgart (DE); Matheus Henrique Mendes Alexandre, Estado de Minas Gerais (BR)

(73) Assignee: MANN+HUMMEL GmbH, Ludwigsburg (DE)

( * ) Notice: Subject to any disclaimer, the term of this patent is extended or adjusted under 35 U.S.C. 154(b) by 189 days.

(21) Appl. No.: 16/538,988

(22) Filed: Aug. 13, 2019

(65) Prior Publication Data
US 2020/0030727 A1 Jan. 30, 2020

Related U.S. Application Data

(63) Continuation of application No. PCT/EP2018/053703, filed on Feb. 14, 2018.

(30) Foreign Application Priority Data

Feb. 14, 2017 (DE) .......................... 102017001380.2

(51) Int. Cl.
*B01D 36/00* (2006.01)
*B01D 17/02* (2006.01)
(Continued)

(52) U.S. Cl.
CPC ....... *B01D 36/008* (2013.01); *B01D 17/0202* (2013.01); *B01D 17/08* (2013.01);
(Continued)

(58) Field of Classification Search
CPC .. B01D 36/008; B01D 17/0202; B01D 17/08; B01J 29/049; B01J 20/12;
(Continued)

(56) References Cited

U.S. PATENT DOCUMENTS 3,853,753 A * 12/1974 Jones ................... B01D 17/045
210/708
5,935,444 A 8/1999 Johnson et al.
(Continued)

FOREIGN PATENT DOCUMENTS

| DE | 69820178 T2 | 5/2004 |
|---|---|---|
| DE | 102007039661 A1 | 3/2008 |

(Continued)

OTHER PUBLICATIONS

Definition of geodesy https://www.lexico.com/en/definition/geodesy (Year: None) (Year: None).*
(Continued)

*Primary Examiner* — Liam Royce

(57) ABSTRACT

A fuel filter has a separating device separating, from a medium flow comprising a first medium and a second medium, the first medium as a separated first medium contaminated with the second medium. The fuel filter has a cleaning device receiving a proportion of the second medium contained in the separated first medium. The cleaning device is arranged upstream of a discharge opening for discharging the first medium from the fuel filter. The cleaning device is provided with an absorbent/adsorbent cleaning material. The cleaning material contains or is made of an organoclay as an active component. The organoclay is a bulk material, wherein at least 50 wt. % of the organoclay has an average particle diameter of greater than 50 $\Phi$m and smaller than 1,000 $\Phi$m.

19 Claims, 9 Drawing Sheets

(51) Int. Cl.
  *B01D 17/00* (2006.01)
  *B01J 20/12* (2006.01)
  *B01J 20/28* (2006.01)
  *C02F 1/28* (2006.01)
  *B01J 29/04* (2006.01)
  *B01J 20/30* (2006.01)
  *C02F 101/32* (2006.01)

(52) U.S. Cl.
  CPC ......... *B01J 20/12* (2013.01); *B01J 20/28004* (2013.01); *B01J 29/049* (2013.01); *C02F 1/288* (2013.01); *B01J 20/3078* (2013.01); *B01J 20/3085* (2013.01); *B01J 2220/62* (2013.01); *C02F 2101/32* (2013.01); *C02F 2201/006* (2013.01)

(58) Field of Classification Search
  CPC .............. B01J 20/28004; B01J 20/3085; B01J 20/3078; B01J 2220/62; C02F 1/288; C02F 2101/32; C02F 2101/006
  See application file for complete search history.

(56) References Cited

U.S. PATENT DOCUMENTS

| | | | |
|---|---|---|---|
| 2003/0015473 A1* | 1/2003 | Murphy | B01J 20/3204 210/691 |
| 2004/0254553 A1* | 12/2004 | Fujimaru | B01J 20/26 604/372 |
| 2010/0096304 A1 | 4/2010 | Gaenswein et al. | |
| 2014/0014567 A1* | 1/2014 | Boodaghians | B01D 27/02 210/282 |
| 2015/0128622 A1 | 5/2015 | Filippone et al. | |

FOREIGN PATENT DOCUMENTS

| | | | |
|---|---|---|---|
| EP | 1463577 A1 | 4/2003 | |
| EP | 1725764 A1 | 11/2005 | |
| EP | 2066417 A2 | 4/2008 | |
| GB | 272927 A * | 1/1928 | ........... B01D 36/008 |

OTHER PUBLICATIONS

Delbem et al. 2010. Modification of a Brazilian smectite clay with different quaternary ammonium salts. Quim. Nova, vol. 33, No. 2, 309-315. (Year: 2010).*

Alther, G., Organically modified clay removes oil from water, Waste Management, Elsevier, vol. 15, No. 8, pp. 623-628, 1995.

Beall, G., The use of organoclays in water treatment, Applied clay science, Elsevier, vol. 24, pp. 11-20, 2003, ISSN: 0169-1317.

* cited by examiner

| Salts | Designation | Formula | Structure |
|---|---|---|---|
| distearyldimethylammonium chloride | DSDMA (1) | [(CH₃)₂C₁₈H₃₇N⁺]Cl⁻ | |
| ditallowalkyldimethylammonium chloride | DTADMA (1) | [(CH₃)₂R₂N⁺]Cl⁻; R = ~65% C18, ~30% C16, ~5% C14 | |
| dialkyldimethylammonium chloride | DADMA (2) | [(CH₃)₂R₂N⁺]Cl⁻; R = ~70% C12 & ~30% C14 | |
| alkyldimethylbenzylammonium chloride | ADMBA (1) | [(CH₃)₂R₂CH₂C₆H₅N⁺]Cl⁻ R = ~2% C10, ~50% C12, ~24% C14, 15% C16, ~11% C16 | |
| hexadecyltrimethylammonium chloride | HDTMA (1) | [(CH₃)₃C₁₆H₃₃N⁺]Cl⁻ | |
| Pentaalkyldimethylhydroxyethylammonium chloride | PADMHEA (1) | [(CH₃)₂C₁₈H₃₇C₂H₄OH)N⁺]Cl⁻ | |

(1) Clariant, (2) Akzo Nobel

Fig. 11

FUEL FILTER WITH ORGANOCLAY, CLEANING CARTRIDGE WITH ORGANOCLAY, AND USE

CROSS-REFERENCE TO RELATED APPLICATIONS

This application is a continuation application of international application No. PCT/EP2018/053703, having an international filing date of 14 Feb. 2018 and designating the United States, the international application claiming a priority date of 14 Feb. 2017 based on prior filed German patent application No. 10 2017 001 380.2, the entire contents of the aforesaid international application and the aforesaid German patent application being incorporated herein by reference.

BACKGROUND OF THE INVENTION

The present invention concerns a fuel filter with a separating device for separating a first medium from a medium flow which comprises a first and a second medium and with a cleaning device for receiving a proportion of the second medium in the separated first medium, wherein the cleaning device is arranged upstream of a discharge opening for the first medium from the fuel filter and comprises an absorbent and/or adsorbent cleaning material.

The invention concerns also a cleaning cartridge for such a fuel filter, use of an organoclay, and a method for removing hydrocarbons or hydrocarbon mixtures from water.

A filter system with water separation device is disclosed in DE 10 2016 002 264.7. In this filter system, active carbon is used as an adsorbent and/or absorbent medium for fuel components contained in the separated water. This has been found to be beneficial for various applications.

Only appr. 5 mg/l of typical diesel fuel can be dissolved in water; when this value is surpassed, the water is saturated, no diesel is dissolved anymore, and emulsion formation takes place. Such diesel-water emulsions cannot be cleaned or cleaned only to a minimal degree by active carbon; therefore, there is the urgent need to provide cleaning by an alternative active material with which even diesel fuel that is present as an emulsion can be removed.

SUMMARY OF THE INVENTION

Based on the aforementioned prior art, it is now the object of the present invention to provide a fuel filter which exhibits an improved adsorption performance for hydrocarbons, in particular diesel fuel present in particular in emulsion form, from water.

The invention solves this object by a fuel filter comprising a cleaning material that comprises an organoclay as active component or consists thereof, wherein the organoclay is present as a bulk material, wherein at least 50 wt. % of the organoclay has an average particle diameter of greater than 50 Φm and smaller than 1,000 Φm.

The invention further solves the problem by a cleaning cartridge characterized in that a cleaning material with an organoclay as an active component is present in the cleaning cartridge.

The invention solves the problem by use of an organoclay for separating a water fraction, which is contaminated with fuel and which is present at least partially as a fuel-water emulsion, in a fuel filter, preferably in a fuel filter according to the invention as set forth above.

The invention further solves the problem by a method for removing hydrocarbons or hydrocarbon mixtures from water that accumulates at a fuel filter of a vehicle or at an internal combustion engine, preferably in a fuel filter according to the invention as set forth above, by means of a cleaning material that comprises an organoclay as active component, wherein the average residence time of the media flow to be purified in the cleaning material amounts to 15 to 40 minutes, preferably 25 to 35 minutes.

A fuel filter according to the invention is suitable for filtration of a media flow comprising a first and a second medium. In this context, the first medium can be preferably water and the second medium diesel fuel.

In the context of the present invention, preferably a mixture of different hydrocarbons is understood as fuel, in particular diesel fuels and biodiesel fuels for use in internal combustion engines. A typical diesel fuel contains usually kerosene, various middle distillate fractions, and currently several volume percent biodiesel as well as various additives (in the ppm range).

In contrast thereto, oils and greases are not encompassed by the definition of a diesel fuel.

The fuel filter according to the invention comprises a separation device for separating a first medium from a media flow that comprises a first and a second medium.

In addition, the fuel filter comprises a cleaning device for receiving a proportion of the second medium contained in the separated first medium that is arranged upstream of a discharge opening for the first medium out of the fuel filter and that contains an absorbent and/or adsorbent cleaning material.

The cleaning material comprises an organoclay as active component or consists of the organoclay.

An active component in the context of the present invention is a component which participates in the adsorption or absorption e.g. of diesel fuel. Thus, an organoclay as a material capable of absorption and/or adsorption can be arranged in a cleaning material for receiving at least a proportion of the second medium contained in the first medium. This cleaning material with the organoclay as active component or consisting of organoclay can be arranged, for example, within a filter system housing or especially also e.g. in a filter element.

The filter system is suitable in particular for the separation of diesel fuel residues in separated water, in particular provided that a diesel-in-water emulsion is present; however, dissolved diesel fuel can also be separated.

The organoclay is present as a bulk material, for example, in the form of granules, wherein the average particle diameter of at least 50 wt. % of the organoclay is greater than 50 Φm and smaller than 1,000 Φm. In this way, too high a flow resistance as it may be caused by finer particles is avoided. Thus, the flow through the bulk material under operating conditions is ensured and blocking is precluded.

In a preferred embodiment variant, the average particle diameter of at least 50 wt. % of the organoclay can be less than 800 Φm. According to a particularly preferred embodiment variant, more than half of the organoclay particles comprise statistically these average particle sizes.

Particularly preferred, the average particle diameter for a mass-based d50 particle size distribution of the organoclay particles can amount to between 100 Φm to 800 Φm, in particular between 200 Φm to 700 Φm.

The average particle diameter can be determined by laser diffraction spectroscopy and relates to the volume-weighted average of all diameters of a non-uniformly shaped particle.

Due to the aforementioned adaptation of the particle sizes, in addition to an acceptable pressure loss of flow through the cleaning device, it is achieved that even finest drops of the second medium, for example, diesel fuel, can be adsorbed and not simply carried therethrough by the flow. A contact time of the first medium with the organoclay that is required for adsorption can thus be adjusted wherein the contact time depends on the further parameters bulk volume and volume flow.

In diesel fuel, free water may be contained which must be removed for the most part prior to entry of the fuel into the injection system. This is possible by a fuel filter according to the invention. Modern diesel fuels with low sulfur content (Aultra low sulfur diesel@, ULSD) contain numerous additives which, in contrast to fuels with no additives or low levels of additives, have the result that the occurring drop sizes become very small and therefore are more difficult to remove.

The average drop diameter of water drops in this context is typically between 10 Φm and 60 Φm. The current test standard (ISO 16332 of 2018) therefore requires 10 Φm as a test condition for filter systems downstream of the fuel conveying pump. In order to separate these fine water drops from the diesel, multi-stage filter systems are required. After the separation process, the separated water still contains finely dispersed diesel drops. The average diameter of the diesel drops in the water phase amounts to below 10 Φm, inter alia by the stabilization by means of surface active components of certain additives. This emulsion does not by itself separate in a practice-relevant time span.

This is a decisive difference to applications in which hydrocarbons are present as a film or only coarsely mixed/emulsified. Examples for this are the separation of oil films or fuel films on water surfaces. Object of the invention is to reliably separate the fine diesel droplets, occurring in modern water separators of fuel filters when using ULSD, from the water phase.

When the pore size of the adsorber bulk material is too large, there is the risk that the diesel droplets are transported together with the flow through the bulk material and do not come into contact with the adsorber. In this case, the cleaning action is not ensured. At the same time, it is important that the dust proportion (particles with very small particle sizes) in the adsorber is minimal because, otherwise, the finest particles will accumulate in the flow direction at the outflow side of the adsorber. This leads to the formation of a particle layer with very high flow resistance which cannot be overcome in the desired application by the pressure that is available.

Further advantageous embodiments of the invention are subject matter of the dependent claims.

The organoclay can be arranged within the fuel filter such that an exchangeability of the organoclay and a renewal of the adsorption capacity of the fuel filter is enabled. After the exchange, the saturated organoclay can be regenerated; this can be done e.g. by heating the clay and optionally also by treating again with an organic cation solution.

The organoclay can advantageously comprise an expanded layer structure. An expanded layer structure of a clay (pillared clay) can be achieved by exchange of ions in the intermediate layer of a layer structure of a clay. In this context, the ions, in particular inorganic cations which occur in the natural clay, are replaced by foreign ions, e.g. by supplied salts, in particular by supplied organic salt solutions. By means of x-ray diffraction, the layer spacings of different clay samples can be determined.

The organoclay, in particular at least an organic component of the organoclay, can advantageously comprise alkyl groups, preferably methyl groups. As an alternative or in addition to the methyl groups, preferably also ethyl groups or other alkyl groups can be provided. The organic component, in particular the alkyl groups, can be embedded in the form of organic cations, e.g. quaternary alkyl ammonium ions, in the intermediate layers of the organoclay.

The organoclay can preferably comprise a layered silicate. In particular, the layered silicate amounts to at least 50 wt. % of the organoclay. In a preferred embodiment variant, the organoclay can also consist of a layered silicate.

The layered silicate can be embodied as a layered silicate of the smectite and/or montmorillonite group which has been organo-modified such that at least one intermediate layer of the aforementioned layered silicate comprises an organic cation, preferably several same-type organic cations, in particular quaternary alkyl ammonium cations. A corresponding classification of the individual clays of the smectite and/or montmorillonite group can be found in the 8th edition of the technical literature AMineralsystematik nach Strunz@ (English version: AStrunz Mineralogical Tables@).

FIG. 11 presents a series of preferred surface-active compounds which can be used for organo-functionalization of clay, e.g., smectites.

Further information and advantages of the individual compounds can be found in DELBEN, M. F.; VALERA, T. A:; VALENZUELA-DIAZ, F. R.; DEMARQUETTE, N. R: Modification of Brazilian smectite clay with different quaternary ammonium salts. Quimica Nova, vol. 33, No. 2, 309-315, 2010.

The organoclay can be arranged alternatively in a fuel filter, preferably in the cleaning device, as a shaped body or coating. In this way, a large surface that is flowed across for separation of the second medium, in particular of the diesel fuel, is made available. Particularly preferred, the shaped bodies can comprise an open-pore structure in order to generate in this way a reduced flow resistance relative to the media flow.

In addition to the organoclay as active material, the cleaning material can also comprise at least one additional material, in particular an inert material, in particular a glass, a ceramic, sand and/or a further active material, in particular a zeolite and/or active carbon that is preferably uniformly embedded in and/or connected to the organoclay. In this way, inter alia a pressure loss-reduced flow through the cleaning material can be enabled. By using a further active material, in particular one of the aforementioned active materials, the adsorption and/or absorption by means of the cleaning material of other substances contained in the media flow, i.e., further media, e.g., a third medium, can be optimized.

In a preferred embodiment variant of an employed organoclay, the FTIR spectra (Fourier transformation infrared spectra) of the organoclay exhibit characteristic hydrocarbon bands in the region of 1,300 $cm^{-1}$ to 1,600 $cm^{-1}$ and/or 2,700 $cm^{-1}$ to 3,100 $cm^{-1}$. These characteristic hydrocarbon bands are produced by the organic modification of a natural clay, i.e., a natural clay does not exhibit these bands which are visible as peaks in the IR spectrograph.

In a further embodiment variant of the fuel filter, it comprises downstream of the separator device a collecting chamber for the separated first medium that is arranged preferably in a position that is geodetically lying below the separating device, wherein the collecting chamber has an outlet which is connected in fluid communication with the cleaning device. The characterization of the position of the collecting chamber can be preferably defined also as below the separation device in the gravity direction. The collecting chamber can be embodied, for example, as a so-called bowl. Moreover, it can be provided that the collecting chamber has an inner separation so that, for example, a geodetic top part for the unpurified first medium is provided and the first medium from which the second medium has been removed is collected in a geodetic bottom part, wherein the cleaning device is present between the geodetic top and bottom parts of the collecting chamber.

The cleaning device can be preferably arranged within a filter system housing correlated with the fuel filter. The discharge opening for the first medium can advantageously be present below the collecting chamber, preferably at or in the filter system housing.

However, in a further variant of a fuel filter according to the invention, the cleaning device can be arranged outside of the filter system housing in a cleaning module which is correlated with the fuel filter and comprises a housing with an inlet and an outlet, wherein preferably in the housing of the cleaning module an exchangeable cleaning cartridge, which is also correlated with the fuel filter, is arranged. In this special variant of the invention, the cleaning material with the organoclay is arranged in this exchangeable cleaning cartridge.

The flow direction of the media flow through the cleaning cartridge can be oriented preferably opposite to the gravity direction in order to enable a uniform flow and venting of the cartridge and to thereby obtain a particularly good absorption and/or adsorption. However, a realization of the flow direction of the media flow in the gravity direction is also possible in the context of the present invention.

In general and independent of the aforementioned embodiment variant and its constructive embodiment, it is of particular advantage, e.g. for reconditioning and handling of the fuel filter, when the cleaning device comprises an exchangeable cleaning cartridge in which the organoclay is arranged.

Furthermore, the invention encompasses a cleaning cartridge which is suitable for a fuel filter according to the invention wherein in the cleaning cartridge a cleaning material with an organoclay as active component is arranged, in particular an organoclay as it is used in the fuel filter according to the invention. The cleaning cartridge can be employed for separation of diesel fuel from water. In this context, the cleaning cartridge is exchangeable, for example, in case of saturation of the organoclay.

It is also possible to employ several cleaning cartridges which in flow direction are arranged one behind the other. For example, by means of one cleaning cartridge a pre-adsorption can be realized and by means of a downstream second cleaning cartridge a post adsorption and/or adsorption of a further, e.g. third, medium. The cleaning cartridges can be exchanged, for example, in different exchange cycles or the cleaning cartridge of the post adsorption can be used as a cleaning cartridge for the pre-adsorption upon exchange. In this way, the cleaning material in the cleaning cartridge is optimally utilized.

Also, it is possible to employ several cleaning cartridges with different composition of the cleaning material. In this way, a stepped separation of several media can be realized.

Numerous further application possibilities of using an individual or several cleaning cartridges can be realized in the context of the present invention.

A method for reducing at least a proportion of the second medium in the first medium can comprise the following steps:

a) providing an organoclay with expanded layered structure comprising at least the following steps:
  i. providing a suspension of a naturally occurring clay, preferably, a layered silicate, in a solvent;
  ii. adding an organic salt compound, in particular a quaternary alkyl ammonium salt, with formation of the organoclay with expanded layered structure;
b) arranging the organoclay in a fuel filter; and
c) supplying a first medium contaminated with a second medium into the fuel filter with separation of the second medium at and/or in the organoclay with expanded layer structure.

The time periods between the respective steps a)-c) can be selected discretionarily long. Typically, providing according to step a) and arranging according to step b) can be done at the factory and supplying can be realized in the region of any internal combustion engine.

Between steps i. and ii., advantageously the addition of an inorganic salt compound can be realized. In this way, the cations of the natural clay mineral are replaced by the cations of the salt compound. Subsequently, the replacement of these cations by the organic cations is possible more easily.

A further aspect of the invention concerns the use of an organoclay for separation of a water fraction, which is contaminated with fuel and which at least partially is present as a fuel-water emulsion, in a fuel filter, preferably in a fuel filter according to the present invention, but not limited thereto. The fuel filter can be used advantageously in any vehicle, e.g., in a motor vehicle, in particular in a road vehicle, a mobile working machine, a water vehicle, in particular in a ship, an aircraft. Moreover, the fuel filter can be present in an internal combustion engine that is used stationarily.

Preferably, the use is realized such that at least a portion of the fuel in the fuel-water emulsion has a drop size of smaller than 50 Φm, preferably smaller than 10 Φm. This is in particular important in order to purify fuel-water emulsion, generated in water separation from modern ULSD, so as to have a low content in regard to the hydrocarbons, preferably <2 mg/l according to EN ISO 9377-2 H53.

Particularly preferred, the use can be such that a reduction of the fuel content in the water contaminated with fuel is realized by at least 95%, relative to weight %.

The initial concentration of the fuel, in particular of the diesel fuel, in water amounts in this context to between 200 ppm to 2,500 ppm. The concentration of the diesel fuel in water after application of the organoclay can then preferably amount to less than 10 ppm, typically between 2 ppm to 8 ppm.

Residual diesel components dissolved in water can advantageously be removed moreover by an active carbon filter downstream of the cleaning device. In the context of a method description, a corresponding method step d) of passing the first medium through an active carbon filter can be realized subsequent to step c).

A last aspect of the invention concerns a method for removing hydrocarbons or hydrocarbon mixtures from water that accumulates at a fuel filter of a vehicle or at an internal combustion engine. The method is performed by use of a cleaning material that comprises an organoclay as active component, wherein the average residence time of the media flow to be purified in the cleaning material is 15 minutes to 40 minutes, preferably 25 minutes to 35 minutes. A sufficient adsorption of diesel fuel is to be expected for this residence time of the media flow to be purified in the active component for the particle size of the organoclay between 50 Φm and 1,000 Φm in accordance with the invention.

BRIEF DESCRIPTION OF THE DRAWINGS

The invention will be explained in the following in more detail with the aid of several drawings. Further advantages of the invention are explained therein in more detail with the aid of embodiments. A person skilled in the art can consider the combined features of the embodiments expediently also individually or combine or modify them to other meaningful combinations.

FIG. 11 presents a table which shows a series of preferred surface-active compounds which can be used for organo-functionalization of clay, e.g., smectites.

DESCRIPTION OF PREFERRED EMBODIMENTS

Figure 1:
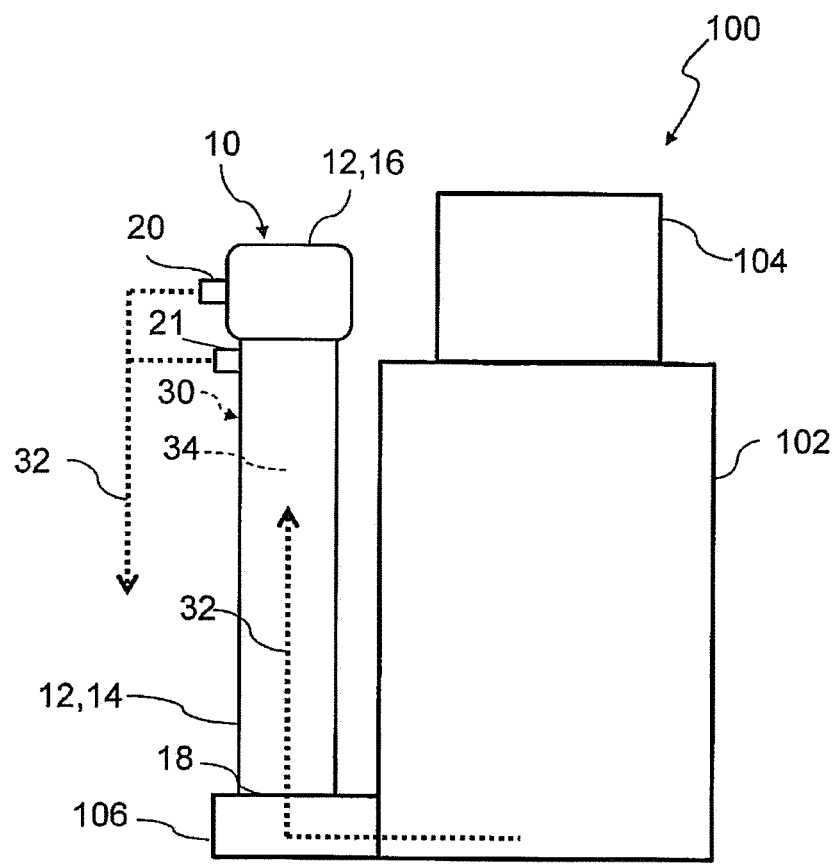
FIG. 1 shows a schematic illustration of a fuel filter in a side view with a cleaning module according to a first embodiment of the invention.

In the Figures, same or same-type components are identified with same reference characters. The Figures show only examples and are not to be understood as limiting.

In the following, the terms diesel and diesel fuel are employed synonymously.

Figure 2:
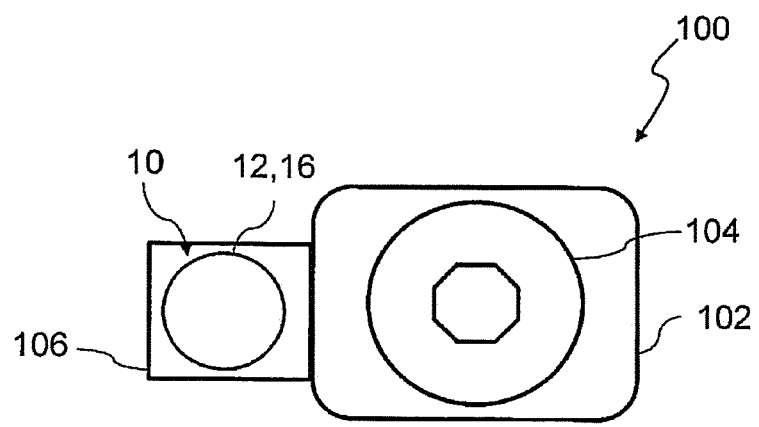
FIG. 2 shows the fuel filter with the cleaning module of FIG. 2 in plan view.
Figure 3:
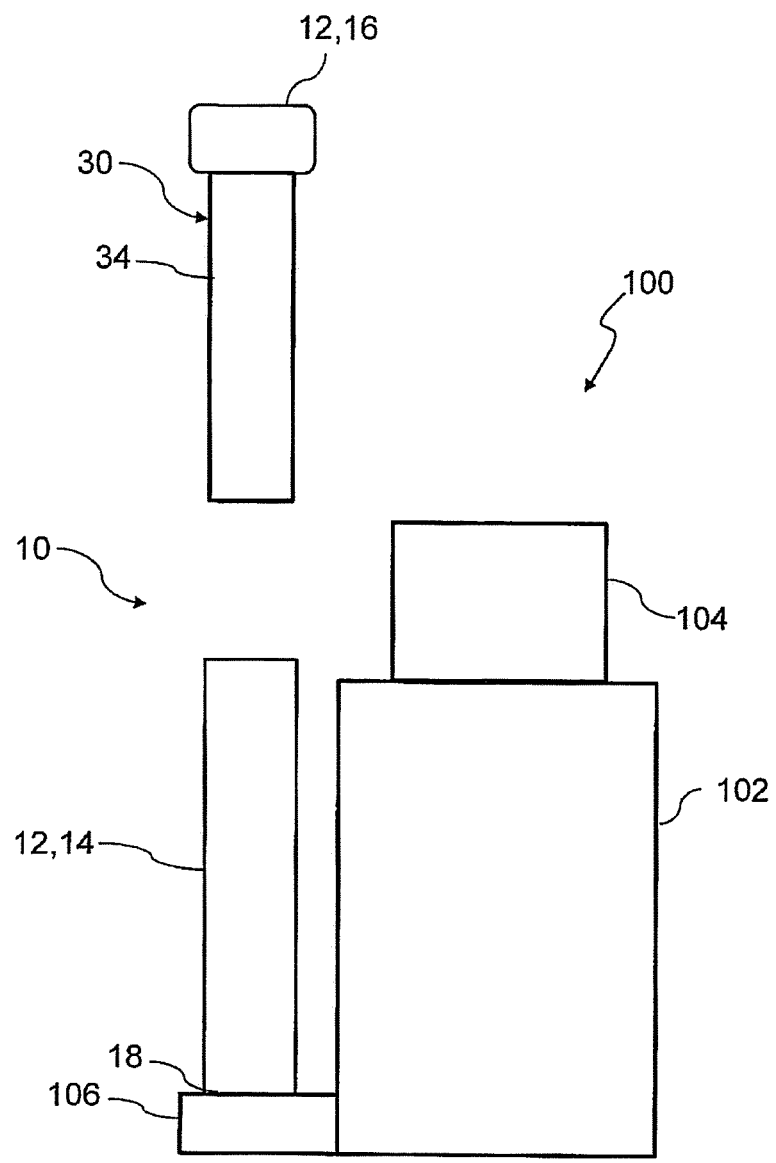
FIG. 3 shows the fuel filter with cleaning module of FIG. 1 with a removed cleaning cartridge.

The invention is illustrated in FIGS. 1 to 3 in an exemplary fashion by one embodiment according to which the cleaning device is embodied as an external cleaning device, namely as a cleaning module 10 for a fuel filter for cleaning a media flow of a first medium contaminated with a second medium, wherein the first medium is water and the second medium is diesel fuel, wherein the water is separated from the diesel fuel in the fuel filter 100.

FIG. 1 shows a schematic illustration of a fuel filter 100 in a side view with a cleaning module 10 according to a first embodiment of the invention. The fuel filter 100 for filtering the media flow comprising the first and the second medium comprises a separating device, not illustrated, for the first medium which is arranged in a filter system housing 102 of the fuel filter. The filter housing 102 comprises a preferably detachable media-tight cover 104 in order to service or exchange a filter element, also not illustrated, in the interior of the filter system housing 102. Further, the fuel filter 100 comprises the cleaning module 10, which is connected by a connecting part 106 with the filter system housing 102, for receiving by adsorption and/or absorption a proportion of the second medium contained in the separated first medium. The cleaning module 10 comprises a housing 12 with an inlet 18 and an outlet or discharge opening 20 at the second housing part 16. The first and the second housing parts 14, 16 are embodied for a media-tight connection with each other that is in particular detachable. In this context, the two housing parts 14, 16 can be, for example, screw-connected or connected by a quick-connect device. Moreover, an outlet 21 is illustrated which is arranged at the first housing part 14. Such a solution is also beneficial because then the second housing part 16, for example, for removing the cleaning cartridge 30, can be removed without having to detach a connection from the outlet 21 to continuative components.

The exchangeable cleaning cartridge 30 is detachably arranged in the housing 12. The cleaning cartridge 30 comprises a cleaning material with an organoclay as an absorbent and/or adsorbent material for receiving at least a proportion of the second medium contained in the first medium.

The cleaning material 34 may comprise furthermore inert materials such as at least a glass, a ceramic, a sand and/or an active material, in particular a zeolite and/or active carbon. This inert material and/or an active material can be embedded preferably and advantageously uniformly in the organoclay and/or connected therewith.

However, the main component of the cleaning material 34, i.e., more than 50 wt. %, can be preferably the organoclay. The cleaning material 34 can also consist completely of organoclay.

The organoclay as an active component of the cleaning material 34 can be provided as loose bulk material and/or provided sintered and/or chemically cross-linked and/or foamed.

In this context, the cleaning material 34 and in particular the organoclay can be arranged as a shaped body, e.g., as a hollow cylindrical shaped body, in particular with an open-pore structure, as a coating, or as granules in the fuel filter 100.

The average particle diameter of at least half of the organoclay granular grains can be larger than 50 Φm. In a particularly preferred embodiment variant, the average particle diameter of at least half of the organoclay granular grains is less than 400 Φm.

Particularly preferred, the average particle diameter for a mass-based d50 particle size distribution of the granules can amount to between 50 Φm to 400 Φm, in particular between 100 Φm to 300 Φm.

The flow direction 32 of the media flow is realized from the filter system housing 102 through the connecting part 106 through the inlet 18 into the housing 12 of the cleaning module 10 where the media flow through the cleaning cartridge 30 in the properly mounted state is oriented opposite to the force of gravity and exits from the cleaning module 10 at the top through the outlet 20 or, in the alternative embodiment, through the outlet 21.

In addition, an indicator for indicating loading with the second medium can be arranged at the cleaning module 10 in order to enable need-oriented servicing.

In FIG. 2, the fuel filter 100 with the cleaning module 10 of FIG. 1 is illustrated in plan view. The filter system housing 102 with a cover 104 is illustrated from above. The cleaning module 10 is arranged on the connecting part 106 which is connected with the filter system housing 102. The second housing part 16 arranged on the connecting part 106 can be seen from above. The outlet 20 has been omitted in this illustration.

FIG. 3 shows the fuel filter 100 with the cleaning module 10 of FIG. 1 with removed cleaning cartridge 30 of the cleaning module 10. The cleaning cartridge 30 with the organoclay-containing cleaning material 34 is arranged in this embodiment at the second housing part 16. The cleaning cartridge 30 can be connected in this context non-detachably to the second housing part 16 and can thus be viewed as a unit. However, it is also conceivable that the cleaning cartridge 30 is detachably arranged at the second housing part 16 and can be removed therefrom and separately exchanged. Accordingly, the cleaning cartridge 30 with the second housing part 16 can be removed like a cartridge upwardly out of the first housing part 14 in order to be exchanged and reconditioned, for example. A new cleaning cartridge 30 with a second housing part 16 can then be inserted again and media-tightly connected with the first housing part 14, for example, screwed on or clipped on, in order to return the cleaning module 10 into its operative state again. The advantage of such an embodiment resides in that upon removal of the cleaning cartridge 30 with the second housing part 16 the residual first medium remains in the first housing part 14 and the environment is thus not soiled.

In a further embodiment of the invention, also the entire cleaning module can be embodied to be removable and thus exchangeable.

Figure 4:
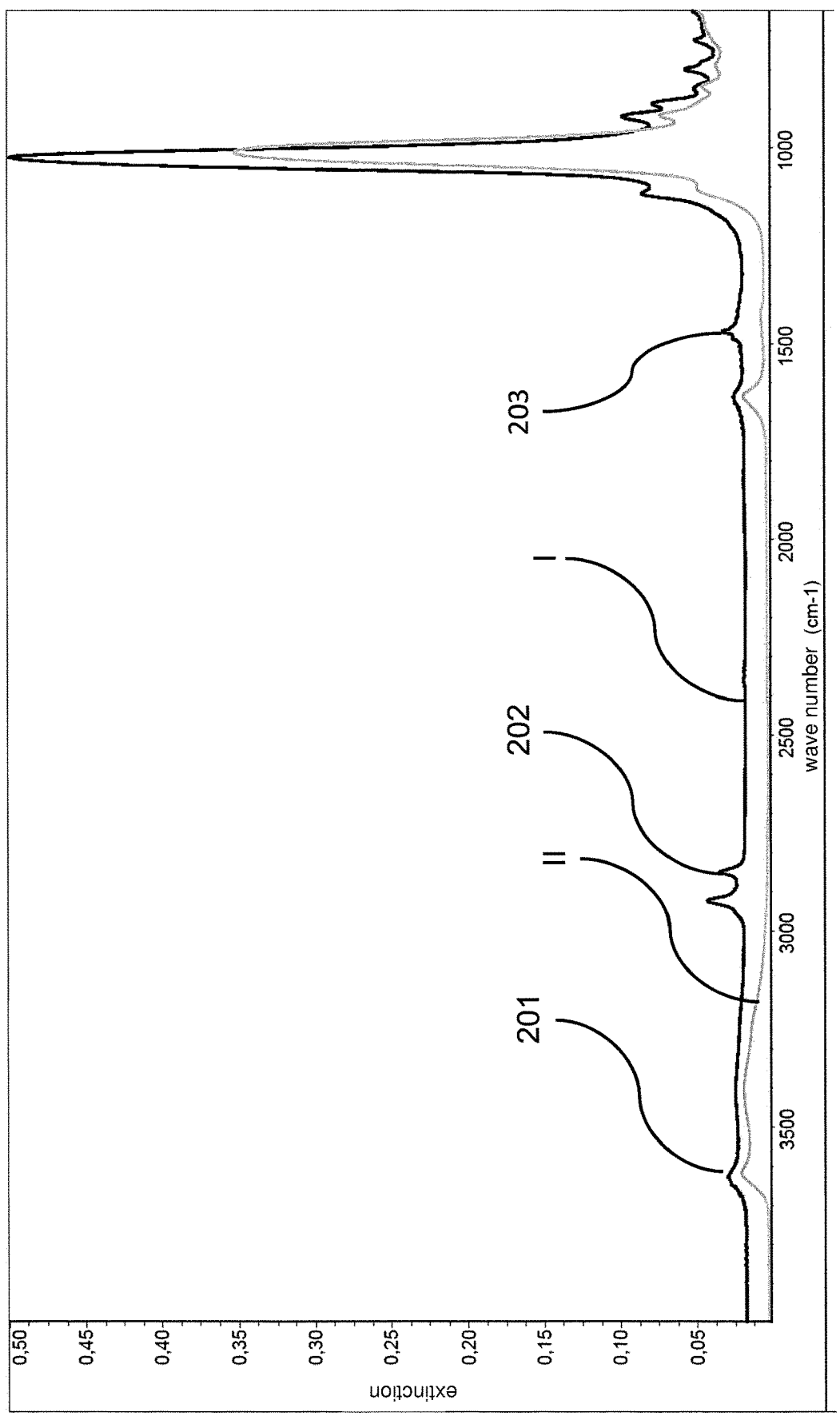
FIG. 4 shows an infrared spectroscopic image of a bentonite embodied as organoclay and of a natural bentonite.

FIG. 4 shows an infrared spectrograph of an organoclay used as active material according to the invention (curve I) and of an unmodified clay (curve II).

In this context, the extinction is plotted against the wave number. One can see characteristic bands 202 for hydrocarbon compounds at a wave number between 2,800 to 3,000 $cm^{-1}$.

In the fingerprint region, one can see bands 203 at a wave number between 1,300 to 1,500 $cm^{-1}$ for hydrocarbon compounds. They are not present in natural clay (curve II).

The bands 201 in the region of a wave number of 3,500 $cm^{-1}$ characterize embedded water and can be found in the organoclay as well as in the naturally occurring clay.

In the following, providing the organoclay will be explained in more detail:

In a first method step, a clay is provided. In this context, preferably a naturally occurring clay can be provided. Particularly preferred clays are clays which are substantially comprised, i.e., at least to 50 wt. %, of smectite and/or at least one montmorillonite. For example, bentonite is such a clay which is utilized in the following for the concrete embodiment.

Bentonite is dispersed in water, preferably in deionized water. In this context, 4 wt. % of clay are dispersed in deionized water for at least 10 hours by stirring at room temperature.

In a second method step, the exchange or homogenization of metal ions which are contained in the provided clay is carried out. In this context, a replacement of metal ions of the clay by sodium ions can be realized. Preferably, for example, $Na_2CO_3$ or NaCl in a concentration of 100 meq (milliequivalents) per 100 g clay can be used. After addition of e.g. sodium carbonate, stirring of the emulsion for at least 10 hours at room temperature was carried out.

In a third method step, a slow addition of a quaternary ammonium salt in aqueous solution is carried out. The concentration amounts to 0.2 g of the surface-active substance to 1 g of clay with stirring for at least 10 hrs. at room temperature.

The suspension is then filtered and washed with deionized water in order to wash out an excess of ions. Subsequently, the organoclay is dried in a vacuum oven at 60° C. for 24 hrs.

The afore described method sequence is referred to also as layer expansion or pillarization. Metal ions are located primarily in the intermediate layers of a clay with layered structure. They are first replaced by sodium ions and later on by organic cations, preferably by quaternary alkyl ammonium ions.

Subsequently, the adsorption and/or absorption capacity of the bentonite modified as organoclay, of a natural bentonite, and of bentonite enriched with active carbon was compared.

For this test, 100 ml of an emulsion of diesel fuel and water with 1,000 ppm diesel fuel was contacted with 2 grams of the respective bentonite, respectively. This clay-water-diesel fuel mixture was then stirred for an hour. This was done by a magnetic stirrer. Subsequently, the emulsion was filtered.

The differences of the remaining water solution could be detected visually. The permeate phase, supplied beforehand with the bentonite modified as organoclay, was significantly more clear than the two other permeate phases.

In a second test, the reactivity of the bentonite converted to organoclay was tested. For this purpose, 50 ml of a diesel-water emulsion with 1,000 ppm diesel was contacted with 0.5 grams of the organoclay, stirred for 10 minutes, and subsequently filtered. As a reference, the same emulsion was only filtered.

While the permeate of the pure diesel-water emulsion showed a significant turbidity after filtration, the permeate of the emulsion to which the organoclay was added was substantially clear and without recognizable turbidity.

The composition of fuels, in particular diesel fuels, can vary from region to region. For example, the biodiesel proportion can vary or the proportion as well as the composition of the additives. In particular biodiesel and additives influence the formation and type of diesel-in-water emulsion which then can be separated only with difficulty. Diesel fuels with a high level of additives which lead to very stable emulsions are found in particular in the EU and the USA because here the sulfur contents in the diesel is minimal due to legislative requirements and the natural lubricating action of the diesel is therefore reduced. In order to regain the lubricating action of the fuel, additive packages are added to the diesel in these countries. In particular the use of a cleaning cartridge according to the invention with organoclay and of a fuel filter according to the invention with water discharge is advantageous for diesel fuels with a high level of additives in order to remove hydrocarbons from the water.

Diesel fuels dissolved in water and diesel-in-water emulsions have very different concentrations of diesel fuel.

Typically, only appr. 5 ppm (mg/l) of diesel fuel pass into water. On the other hand, emulsions have a detected proportion of up to 2,500 ppm of diesel fuel, in particular C10-C40 hydrocarbon compounds.

The detection of the proportion of the diesel fuel in water can be realized in both cases by measurement according to DIN EN ISO 9377-2 H53.

In practice, mostly diesel fuels with a high level of additives are encountered. They comprise almost always diesel fuel-in-water emulsions because the additives stabilize the fine diesel drops (they can have a fineness of 5 Φm up to d50 (mass-based)) and no separation of water phase and diesel phase due to the density differences occurs therefore. Diesel with high levels of additives are used in all countries in which a low sulfur diesel is required by law, thus e.g. in the EU (EN 590 fuel) but also in the USA. This means that for these markets a cleaning system with active carbon provides no satisfactory filtration performance; however, the organoclay can even clean the emulsion and the environment can thus be protected.

Figure 5:
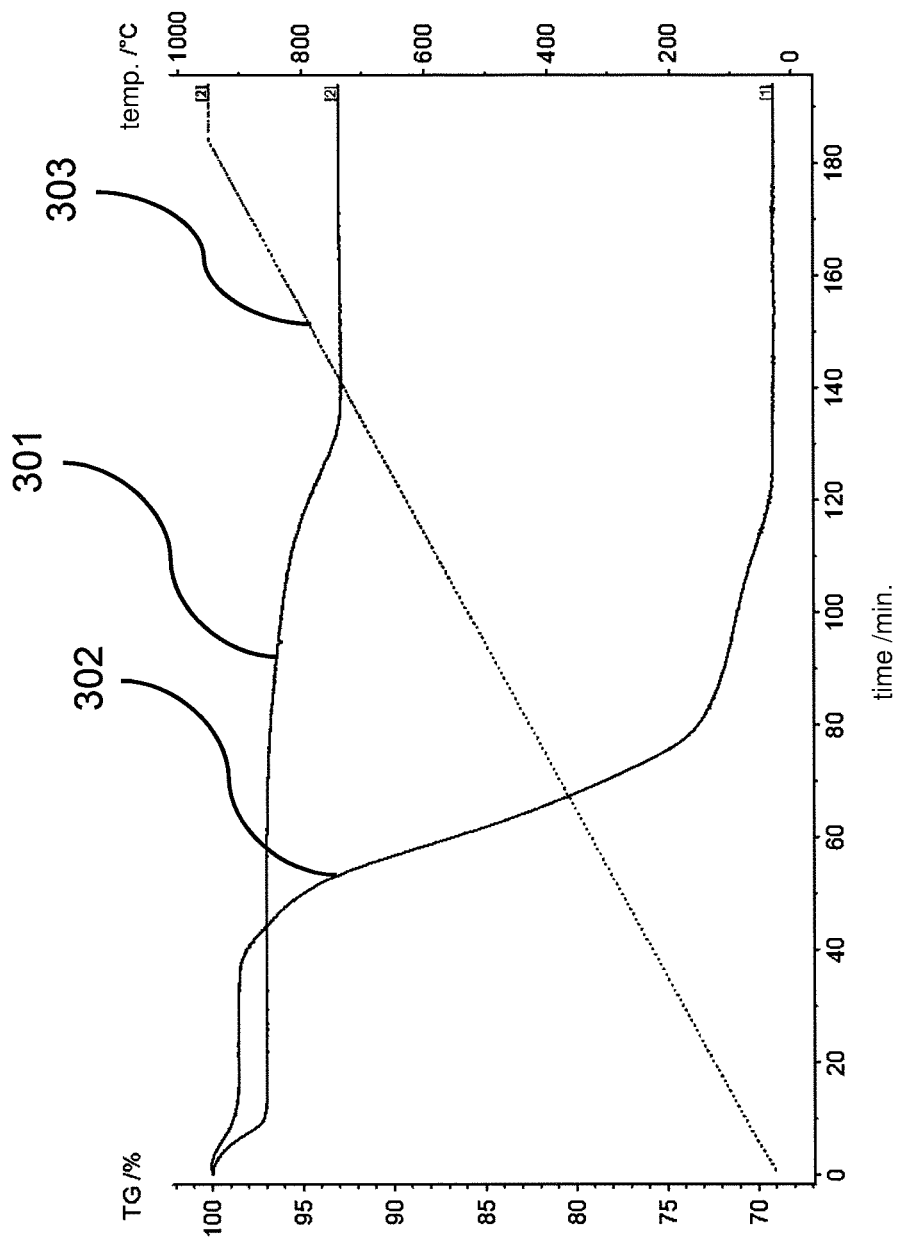
FIG. 5 shows a thermogravimetric diagram.

FIG. 5 shows thermogravimetric measurements of a natural clay with the measured curve 301 and of an organoclay with the measured curve 302 for comparing the two materials in one diagram.

The temperature increase for the gravimetric measurement is illustrated by the inclined straight line 303.

In this context, three phases are characteristic when heating the modified clay.

Phase a: First surface water (<100°) evaporates; this can be seen in the natural as well as the modified clay by means of the plateau.

Phase b: Subsequently, the measured curve 302 of the modified clay, i.e., of the organoclay, passes into a region with negative incline (appr. 40 min., 300° C.). A degradation/combustion or, more generally, ʌpassing into the gas phase@ of the organic components takes place; only the modified clay shows this type of curve.

Phase c: Beginning at appr. 600° C., this is overlaid with a release of chemically sorbed water. This can be seen well in the region of negative incline also in the natural clay (301) in this region.

Moreover, one can see in this diagram that the proportion of organic components in organoclay amounts to appr. 25 wt. % (y axis begins at 65 wt. %).

Figure 6:
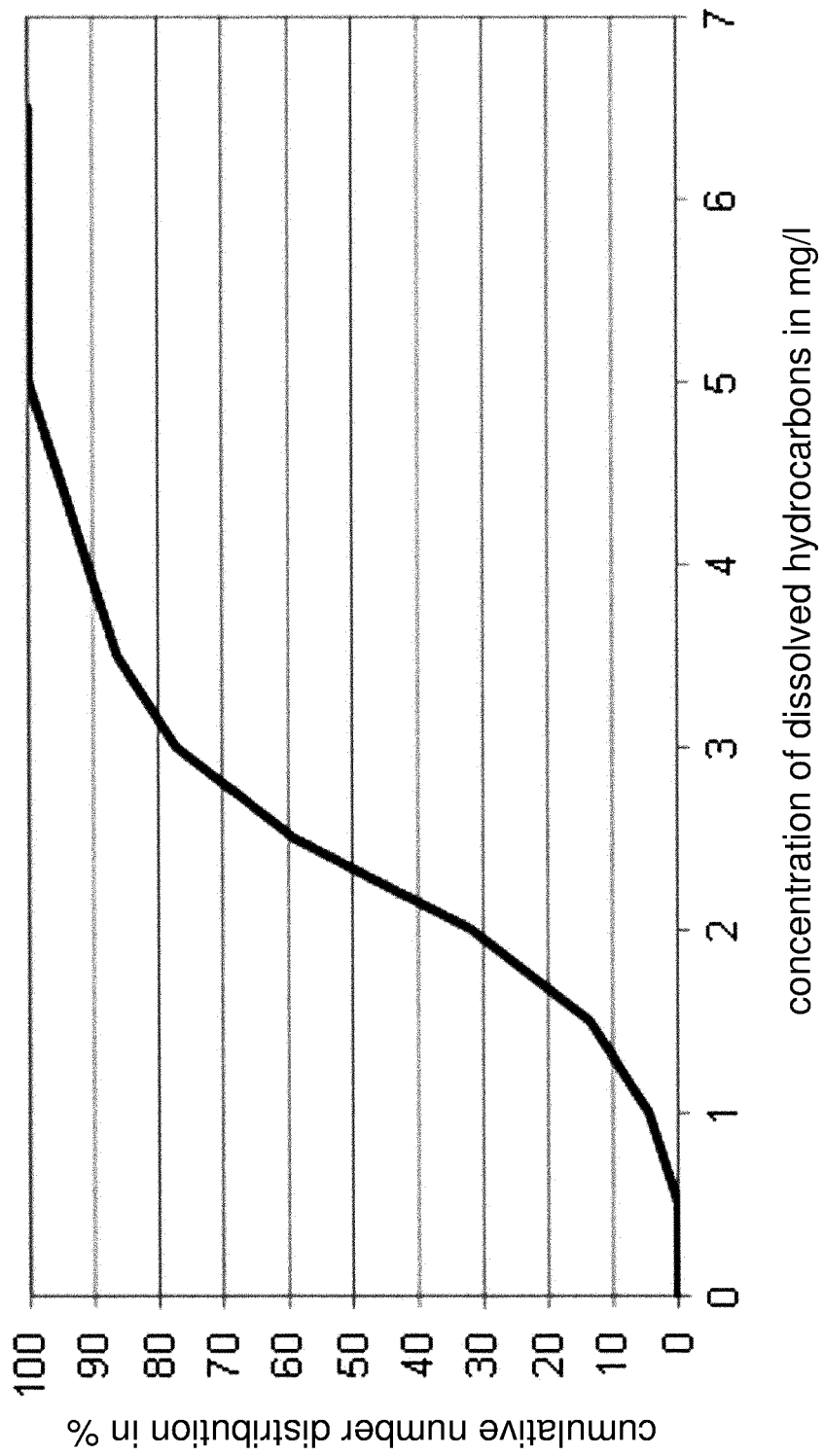
FIG. 6 shows a solubility diagram of diesel fuel in water.

FIG. 6 shows concentration of dissolved hydrocarbons in mg/l according to DIN EN ISO 9377-2 H53 under operating conditions: The diagram shows that on average the concentration of dissolved hydrocarbons by use of DIN EN 590 gas station diesel fuel and deionized water with gentle mixing (no emulsion formation) is below 3 mg/l.

The diagram illustrates the difference between diesel fuel which is dissolved in water and a diesel fuel-in-water emulsion. When the value of appr. 5 mg/l is surpassed, the water is saturated, no diesel will dissolve anymore, and an emulsion formation takes place. This type of emulsion cannot be separated or only minimally separated by active carbon. In contrast, the organoclay due to its surface properties is capable of cleaning even a diesel fuel-in-water emulsion.

Figure 7:
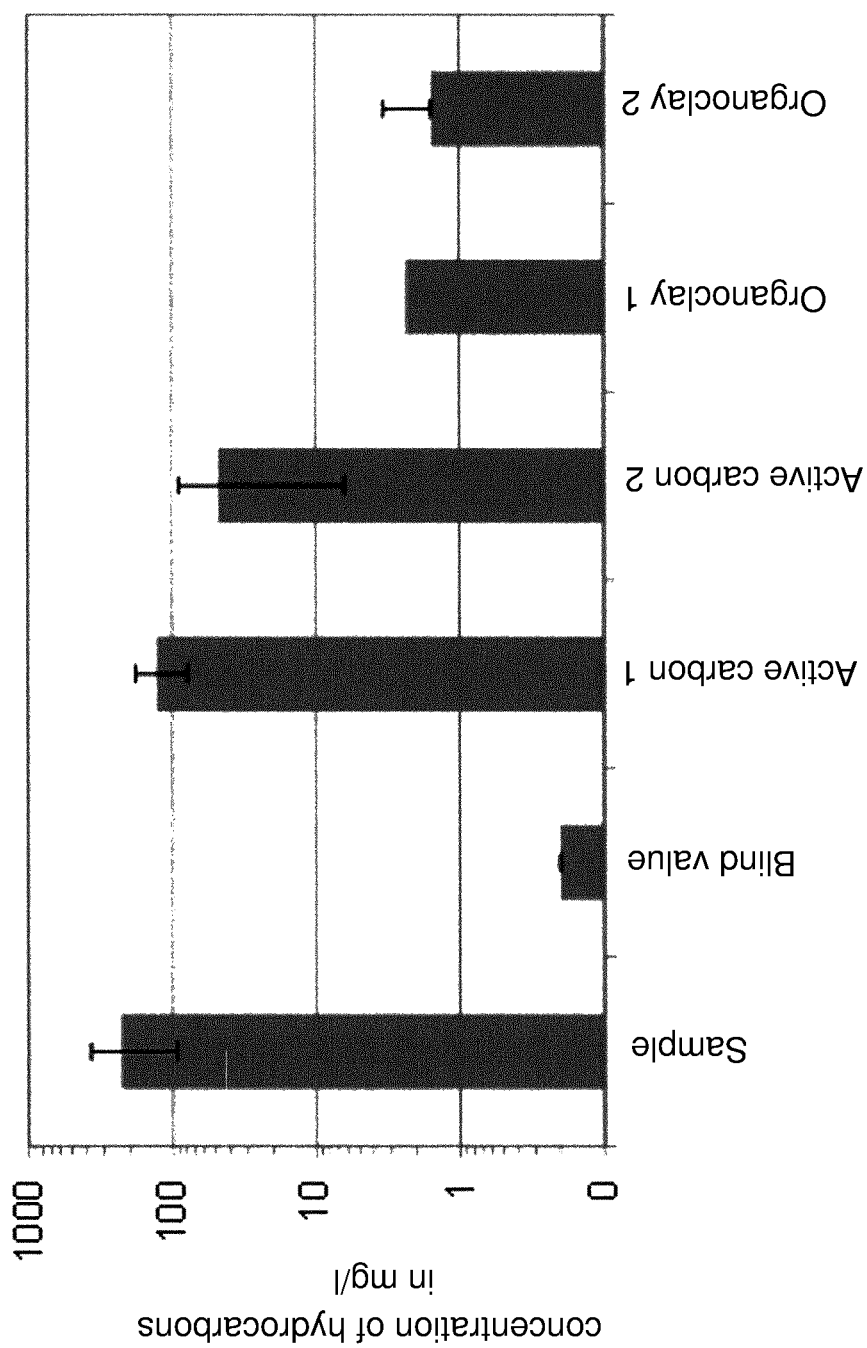
FIG. 7 shows comparative measurements of the adsorption capabilities between active carbon and organoclay.

FIG. 7 provides a comparison between cleaning of a diesel fuel-water mixture with active carbon and organoclay, in particular the cleaning action of different adsorbents, namely of organoclay and active carbon under practice-near conditions (measured values recorded according to DIN EN ISO 9377-2 H53).

While by active carbon only dissolved diesel or other hydrocarbons can be separated from water, the organoclay is capable of purifying also a diesel fuel-in-water emulsion.

FIG. 7 also shows that the concentration of hydrocarbons in water can fluctuate.

At ʌsample@, a diesel fuel-in-water emulsion is illustrated which is utilized as an initial concentration of hydrocarbons of the mixture prior to contact with an adsorption and/or absorption medium. At ʌblind value@, the measured value of the test apparatus when pure water is conveyed through it is illustrated.

Further bars show respectively a diesel fuel-in-water mixture after its treatment with the respective illustrated adsorption and/or absorption medium under analogous conditions. When comparing the final concentration based on logarithmic scale division, one can see that active carbon is hardly capable of separating the emulsion. The organoclay can purify the emulsion better than active carbon by a factor 20 to 80. Inter alia, the surface properties and inner properties can account for this. The determined blind value is by the factor 10 below the determined measured values and shows thus the reliability of the test configuration.

The emulsion of water and diesel due to certain additives is very stable so that a density separation essentially does not occur and the diesel drops essentially do not coalesce. The droplet sizes in the emulsion are very small, typically smaller than 10 Φm. The non-coalescence is caused by the additives while the small droplet diameters are determined by the path of the diesel-water mixture through the fuel filter. The development goes toward the use of fuels that contain even less sulfur and higher levels of additives so that this problem will be aggravated, even worldwide due to environmental laws.

Figure 8A:
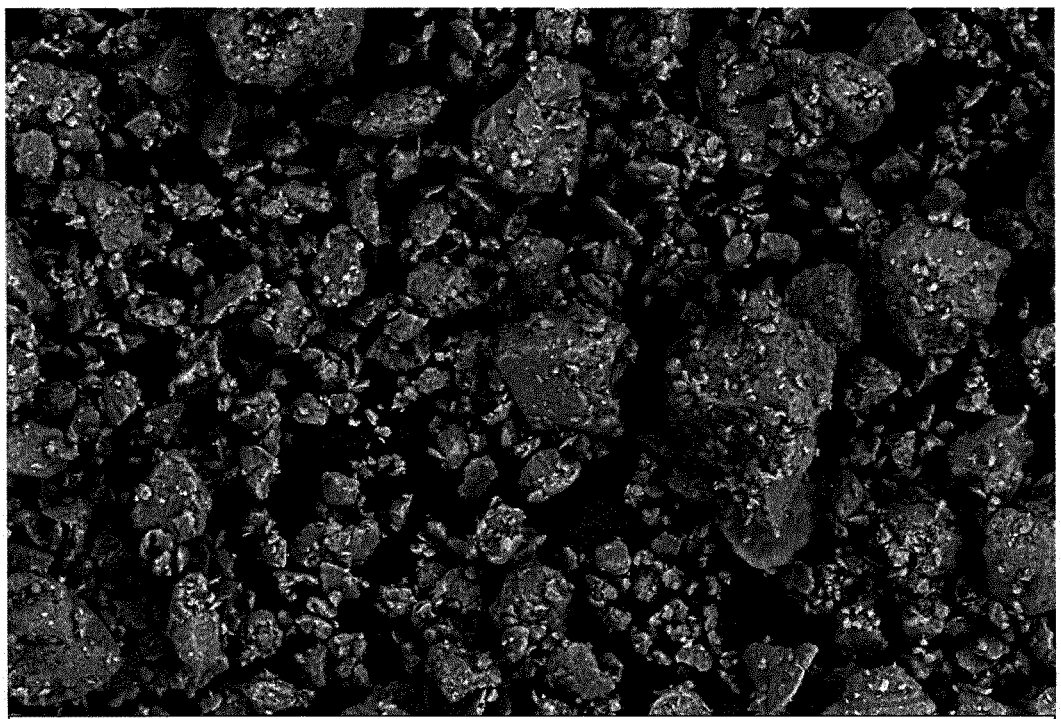
FIG. 8a shows an SEM image of a natural clay (bentonite).
Figure 8B:
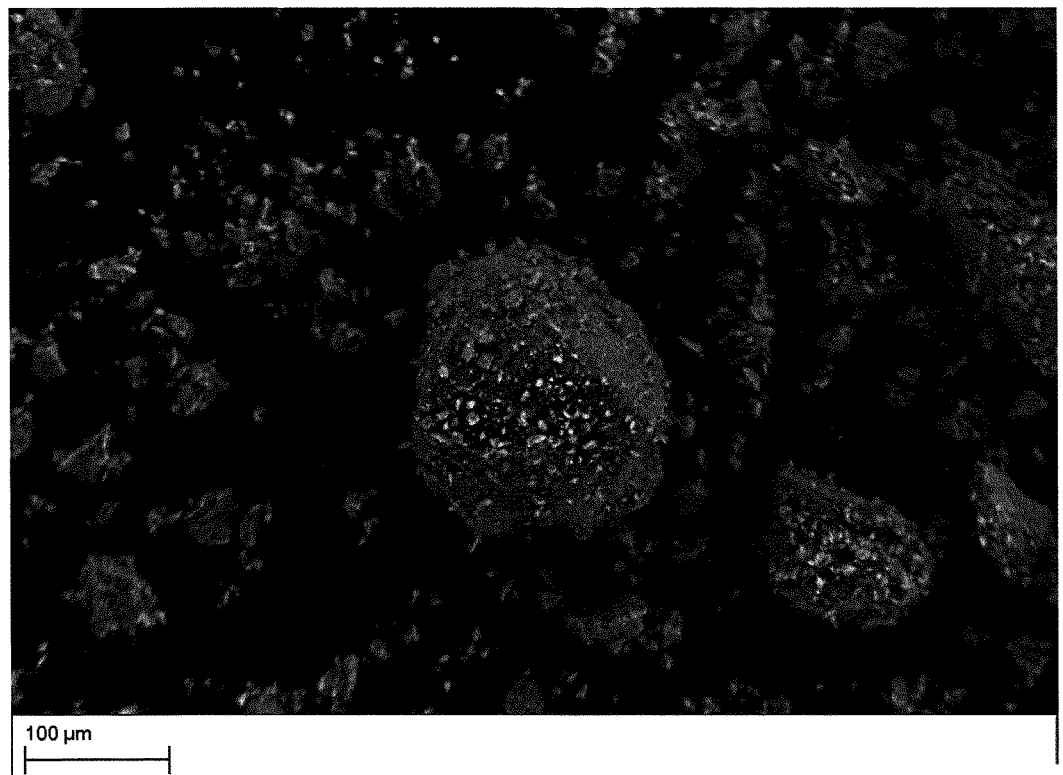
FIG. 8b shows an SEM image of an organoclay.

In FIGS. 8a and 8b, the grain sizes of natural clay (FIG. 8a) and of the organoclay (FIG. 8b) are compared under analogous measuring conditions and at identical scale of illustration. Symptomatic for natural clay are very small grain sizes which can lead to a very high flow resistance up to blocking of the cleaning material. In contrast thereto, the organoclay in FIG. 8b shows a more compact form with increased grain size.

Figure 9:
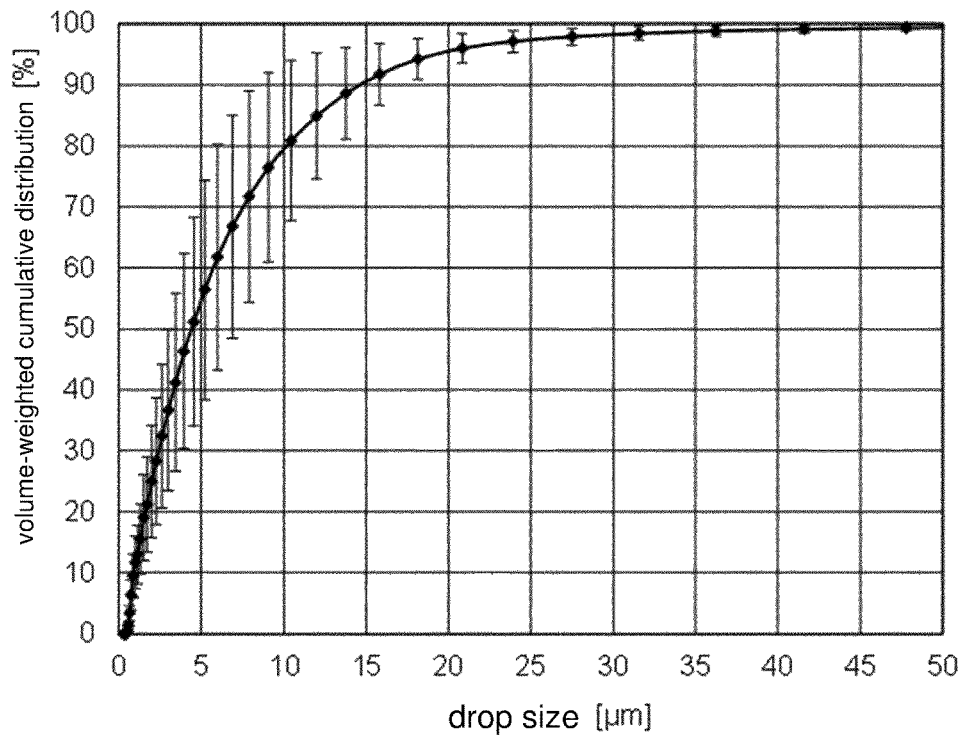
FIG. 9 shows a typical cumulative distribution of the drop sizes of diesel in water after the separation of the water from the diesel by means of an in particular multi-stage fuel filter.

FIG. 9 shows a typical cumulative distribution of the drop sizes of diesel in water after the separation of the water from diesel with low sulfur content (ULSD according to EN 590) by means of an in particular multi-stage fuel filter.

Modern diesel fuels contain numerous additives which have become necessary to a great extent only due to the introduction of low sulfur contents (ULSD: ultra low sulfur diesel, 10 ppm). The additives ensure inter alia a satisfactory lubricating action of the fuel because the natural lubrication-improving agents are largely removed due to the process of desulfurization. With higher additive content the water separation becomes more difficult so that increasingly multi-stage water separators are used in order to realize even across the entire service life a functioning water separation. This change affects also the quality of the discharged water: While with a fuel comprising a low level of additives the separated water is still clear and contains for example <10 mg/l of hydrocarbons, in case of modern fuel filters with integrated water separation an emulsion instead of the clear water phase is produced. This emulsion is comprised of finest diesel droplets which are stabilized by the additives and can have a hydrocarbon contents according to EN ISO 9377-2 H53 of 200 mg/l up to >2,500 mg/l.

The average drop diameter in this context is typically below 10 Φm. This is the decisive difference to applications in which hydrocarbons are present as film or only coarsely mixed/emulsified. Examples of this are the separation of oil films or fuel films from water surfaces.

By means of the cleaning device of the fuel filter according to the invention, the fine diesel droplets that occur in case of modern water separators of fuel filters when using USLD can be separated reliably from the water phase.

Figure 10:
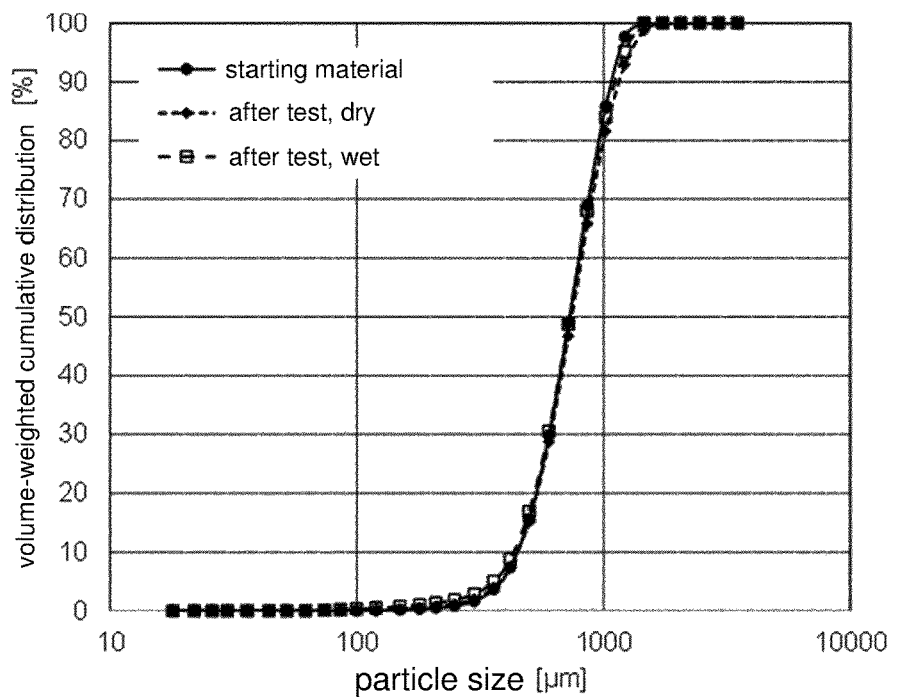
FIG. 10 shows a cumulative distribution of the particle sizes of an organoclay bulk material of a fuel filter according to the invention.

In FIG. 10, finally an exemplary cumulative distribution of the particle sizes of an organoclay bulk material of a cleaning device of a fuel filter according to the invention is illustrated.

By such an adaptation of the particle sizes, it can be prevented that the aforementioned finest diesel droplets are entrained by a flow through the bulk material in addition to ensuring an acceptable flow resistance. Moreover, in this context the contact time of the medium with the organoclay is an important parameter. The larger the surface of the adsorber, the faster the adsorption. However, even in systems having a high inner porosity such as e.g. active carbon, only a minimal part of the surface is located at the outer side of the adsorber particles. This means that the substance transport of the medium to be removed from the surface of the particle into the inner surface can become a limiting factor with respect to time.

In automotive applications, the installation space as well as the available contact time is very limited. Water that accumulates must be discharged, cleaned, and drained in a few minutes up to hours from the fuel circuit. The installation space in modern vehicles is very limited so that the adsorber must be designed to be as compact as possible. The sensible installation size of the adsorber container is between 200 ml and 400 ml, installation sizes of >600 ml can hardly be accommodated in usual installation spaces at the motor as well as at the vehicle.

Therefore, it is necessary to adjust a defined particle size of the adsorber particles (organoclay) and to match the residence time in the system as well as the volume of the adsorber relative to each other. According to the invention, the adsorber is therefore matched to the special conditions at the fuel supply system of a vehicle and/or motor. The average residence time of the water in the adsorber amounts to appr. 30 minutes in an exemplary automotive application. The residence time in this context can be, for example, adjusted by the control of a valve. Between each discharge cycle, a defined intermission ensures that the required contact time for cleaning is maintained. Across several opening cycles, the water to be purified can be conveyed by means of the pressure of the fuel supply system through the adsorber.

In mobile applications in a motor vehicle but also in stationary applications of the fuel filter according to the invention in which the latter is mounted at an internal combustion engine, furthermore vibrations occur that may not lead to an impermissible change of the particle size distribution, in particular, the vibration effect must not move the particle size distribution to smaller particle sizes.

In FIG. 10, in addition to the particle size distribution of the organoclay starting material, a curve of a particle size distribution after vibration testing in dry state as well as in wet state, i.e., completely wetted with water, is therefore illustrated. In the initial state, the particle diameter is 700 $\Phi$m at 50% of the volume-weighted cumulative distribution; it can be seen that this value is essentially constant even after vibration testing.

In this way, it is ensured that the flow through the bulk material, i.e., also the cleaning performance, is available across the service life of the cleaning device.

What is claimed is:

1. A fuel filter comprising:
a fuel filtering system comprising:
a filter system housing (102) having:
a base at a lower end of the filter system housing in a direction of gravity;
a detachable cover (104) closing an upper end of the filter system housing;
a circumferential outer wall extending from the base to the upper end of the filter system housing; and
a connecting part (106) connected to the circumferential outer wall at the base and projecting radially outward away from the circumferential outer wall in a direction transverse to the direction of gravity; and
an absorbent cleaning device (10) comprising:
a first tubular housing part (14) having:
a lower end, relative to the direction of gravity, resting on the connecting part (106) and receiving filtered fluid from the filter system housing (102) through the connecting part (106);
an open upper end relative to the direction of gravity,
an outer wall extending from the lower end to the upper end of the first tubular housing part (14);
an absorbent cleaning cartridge (30) configured to insert into an interior of the first tubular housing part (14) through the open upper end of the first tubular housing part (14) such that the absorbent cleaning cartridge is removable through the open upper end of the first tubular housing part (14) for exchange or service;
wherein the absorbent cleaning cartridge (30) comprises:
an adsorbent cleaning material (34) having at least 50% organoclay as an active adsorbent/cleaning component, arranged in an interior of the removable absorbent cleaning cartridge (30);
wherein the absorbent clearing cartridge includes at least one outlet discharge opening (20,21) arranged at an upper end of the absorbent cleaning cartridge, relative to the direction of gravity, such the fluid flows upwards from the connecting part (106), through the adsorbent cleaning material (34) to discharge from the absorbent cleaning cartridge (30) at the upper end of the absorbent cleaning cartridge;
wherein the fuel filtering system is configured to filter fuel having one or more hydrocarbons contaminated with water;
wherein the fuel filtering system separates a first portion of the water from the one or more hydrocarbons, to produce a separated mixture having water contaminated with a remaining portion of the one or more hydrocarbons, the separated medium exiting the filter system housing (102) through the connecting part (106) and entering into the lower end of the cleaning device (10) to enter the absorbent cleaning cartridge (30);
wherein the adsorbent cleaning device receives the separated mixture having the water contaminated with the remaining portion of the one or more hydrocarbons;
wherein the adsorbent cleaning material having the organoclay in the adsorbent cleaning cartridge is configured to adsorb at least a portion of the remaining portion of the one or more hydrocarbons from the separated mixture of the fuel filtering system;
wherein the organoclay is a bulk granular material, wherein at least 50 wt. % of the organoclay has an average particle diameter of greater than 50 $\Phi$m and smaller than 1,000 $\Phi$m.

2. The fuel filter according to claim 1, wherein the fuel is diesel fuel.

3. The fuel filter according to claim 1, wherein an organic component of the organoclay comprises alkyl groups.

4. The fuel filter according to claim 3, wherein the alkyl groups include methyl groups.

5. The fuel filter according to claim 1, wherein the organoclay comprises a layered silicate.

6. The fuel filter according to claim 5, wherein the layered silicate belongs to the smectite-montmorillonite group and is modified chemically such that at least one intermediate layer of the layered silicate comprises at least one organic cation.

7. The fuel filter according to claim 1, wherein the adsorbent cleaning material further comprises at least one additional material and the at least one additional material consists of one or more inert materials, or one or more active materials, or a combination of one or more inert materials and one or more active materials.

8. The fuel filter according to claim 7, wherein the one or more inert materials are selected from the group consisting of a glass, a ceramic, and sand.

9. The fuel filter according to claim 7, wherein the one or more active materials are selected from the group consisting of a zeolite and active carbon.

10. The fuel filter according to claim 7, wherein the at least one additional material is uniformly embedded in the organoclay and/or connected to the organoclay.

11. The fuel filter according to claim 1, wherein the organoclay is characterized by FTIR spectra comprising characteristic hydrocarbon bands in a region of 1,300 $cm^{-1}$ to 1,600 $cm^{-1}$ and/or in a region of 2,700 $cm^{-1}$ to 3,100 $cm^{-1}$.

12. The fuel filter according to claim 1, wherein a flow direction of the separated mixture through the cleaning cartridge is opposite to the direction of gravity.

13. A method of separating a water fraction, contaminated with fuel and existing at least partially as a fuel-water emulsion, in a fuel filter according to claim 1, the method comprising using the organoclay to adsorb and/or absorb the fuel.

14. The method according to claim 13, wherein the fuel filter is arranged at a vehicle or at an internal combustion engine.

15. The method according to claim 13, wherein at least a portion of the fuel in the fuel-water emulsion has a drop size smaller than 50 Φm.

16. The method according to claim 15, wherein the drop size is smaller than 10 Φm.

17. The method according to claim 13, comprising reducing by at least 98% a fuel content in the water fraction that comprises a fuel concentration of the fuel of 200 ppm to 2,500 ppm.

18. A method for removing hydrocarbons or hydrocarbon mixtures from water to be purified that accumulates at a fuel filter according to claim 1, the method comprising:
providing an average residence time of the water to be purified in the adsorbent cleaning material of 15 minutes to 40 minutes.

19. The method according to claim 18, wherein the residence time is 25 minutes to 35 minutes.

* * * * *